United States Patent [19]

Merola

[11] 4,293,920
[45] Oct. 6, 1981

[54] TWO-DIMENSIONAL TRANSFORM PROCESSOR

[76] Inventor: Pasquale A. Merola, 2020 Cottontail La., Brookfield, Wis. 53005

[21] Appl. No.: 71,645

[22] Filed: Sep. 4, 1979

[51] Int. Cl.³ .......................................... G06F 15/332
[52] U.S. Cl. ................................... 364/725; 358/133; 358/260; 364/515
[58] Field of Search ............... 364/515, 725, 727, 826, 364/841, 862; 358/133, 260

[56] References Cited

U.S. PATENT DOCUMENTS

| | | | |
|---|---|---|---|
| 3,277,449 | 10/1966 | Shooman | 364/200 |
| 3,413,611 | 11/1968 | Pfuetze | 364/900 |
| 3,438,003 | 4/1969 | Bryan | 364/900 |
| 3,509,542 | 4/1970 | Ehrman | 364/900 |
| 3,535,694 | 10/1970 | Anacker et al. | 364/200 |
| 3,775,602 | 11/1973 | Alexandridis et al. | 364/727 |
| 3,775,753 | 11/1973 | Kastner | 364/900 |
| 3,981,443 | 9/1976 | Lynch et al. | 364/715 |
| 4,055,756 | 10/1977 | Jolivet et al. | 364/725 |
| 4,134,134 | 1/1979 | Lux | 358/133 X |
| 4,161,785 | 7/1979 | Gasparek | 364/862 X |

Primary Examiner—Jerry Smith

[57] ABSTRACT

A processor capable of performing a two-dimensional transform on high speed serial sampled analog raster scanned data and outputting the results in a parallel fashion so as to provide for a data rate reduction. The processor utilizes a charge coupled device (CCD), a matrix multiplier to perform a one-dimensional transform on data samples from a serial to parallel converter. The data is switched into a set of matrix multipliers which perform another transformation whose results are summed in an accumulator to yield the desired two-dimensional transformed coefficients.

2 Claims, 10 Drawing Figures

TWO-DIMENSIONAL TRANSFORM PROCESSOR

BACKGROUND OF THE INVENTION

1. Field of the Invention

This invention relates generally to any processing system requiring a two-dimensional transformation of source data, and more specifically to video bandwidth compression systems which use transform and coding techniques to minimize the number of coding symbols required to describe an image.

2. Description of Prior Art

Two-dimensional transforms are ordinarily generated either optically or through the use of a digital computer. Both methods suffer from severe limitations in many signal processing applications. A general purpose digital computer large enough to perform two-dimensional transforms in real time is heavy, expensive, and consumes an excessive amount of power for many airborne transform encoder applications. Coherent optical two-dimensional transform implementations interface poorly with electronic systems and the aircraft environment. Another approach to performing a two-dimensional transformation consists of performing a row by row one-dimensional transform with serial access hardware, storing the one-dimensional transform coefficients in place, and then performing a column by column one-dimensional transform. A block diagram of a row-then-colum transform processor is shown in FIG. 1. Basically, in performing an N by N transform, each row is divided into blocks of N pixels or resolution elements. A one-dimensional N-point transform is applied to each horizontal block and the transform coefficients are stored in the memory. Since N rows must be transformed and stored before the one-dimensional transform can be applied in the vertical direction, this intermediate memory size must be N lines. As indicated in FIG. 1, a redundant N-line memory is required so that while the transform is applied in the vertical direction the transform coefficients for the next N rows can be stored.

The primary shortcomings of this approach is that the processor architecture does not allow for a reduction in sample rate which, depending upon the resolution requirements of the system can be high. For instance, for a state of the art processor, the sample rate could be as high as 9.7 million samples/second.

Such a high speed requirement causes implementation problems in two areas. First of all, a "corner turning" operation is required in order to organize the row transformed coefficients before the transform can be applied in the vertical direction. This operation becomes difficult to implement at the higher speeds. More significant, though, is the high speed A/D converter requirement. State of the art A/D converters operating at 10 MHz and 8 bits are either large, expensive, or not readily available. When this is combined with low power requirements, the row-then-column implementation of the two-dimensional cosine transform does not become practical for most low cost airborne encoder applications.

Accordingly, it is an object of the present invention to provide a two-dimensional transform processor which is organized to accept high speed serial sampled analog input data and to output the results in a parallel fashion resulting in a data rate reduction for subsequent processing.

A further object is to accomplish two-dimensional transform processing at a fraction of the cost, size, weight and power required by other two-dimensional transform techniques.

SUMMARY OF THE INVENTION

The foregoing objects are achieved according to this invention by circumventing the high data rate and storage requirements associated with performing two-dimensional transformations by prior art techniques. The processor utilizes a charge coupled device (CCD), a matrix multiplier chip, to allow raster scanned data to be processed directly and efficiently. In contrast to the row-then-column approach where memory is used to hold the horizontally transformed data in position until the transform in the second direction is applied, the proposed approach is based upon operating on the raster organized data such that the contribution of the row data within a particular sub-block, to all of the two-dimensional frequency components is calculated. This partial result is stored and added to the corresponding transform coefficient contribution of the next data row within the next two-dimensional data sub-block. When the contribution of the last row in the sub-block is added to the accumulated sums over the previous rows, the process is complete. This processing approach is highly advantageous in that the resultant processor organization accepts the high-speed sampled-analog input video data and outputs the two-dimensional coefficients in a parallel mode, resulting in a significant data rate reduction for the processing which follows (i.e., a significant reduction in the high-speed A/D converter requirement). In addition, since the coefficients are generated independently the hardware associated with those coefficients assigned zero bits by the quantizer can be eliminated, providing additional savings in size, costs, and power dissipation.

BRIEF DESCRIPTION OF THE DRAWINGS

Various other objects, features and attendant advantages of the present invention will be more fully appreciated from the following detailed description in connection with the accompanied drawings.

DESCRIPTION OF THE PREFERRED EMBODIMENT

The two-dimensional transform processor uniquely circumvents the high data rate and storage requirements associated with performing two-dimensional transforms. The processor is capable of accepting raster scanned data directly and performs its procesing efficiently with a here-to-fore unknown application of a matrix multiply charged coupled device previously described in U.S. Pat. Nos. 4,156,284 and 4,161,785 which are assigned to the assignee of the present application.

Figure 1:
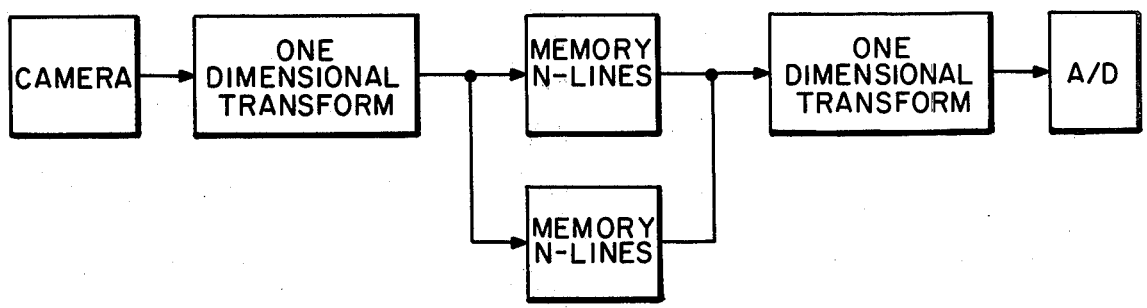
FIG 1 is a block diagram of a conventional means two-dimensional transform processor.
Figure 2:
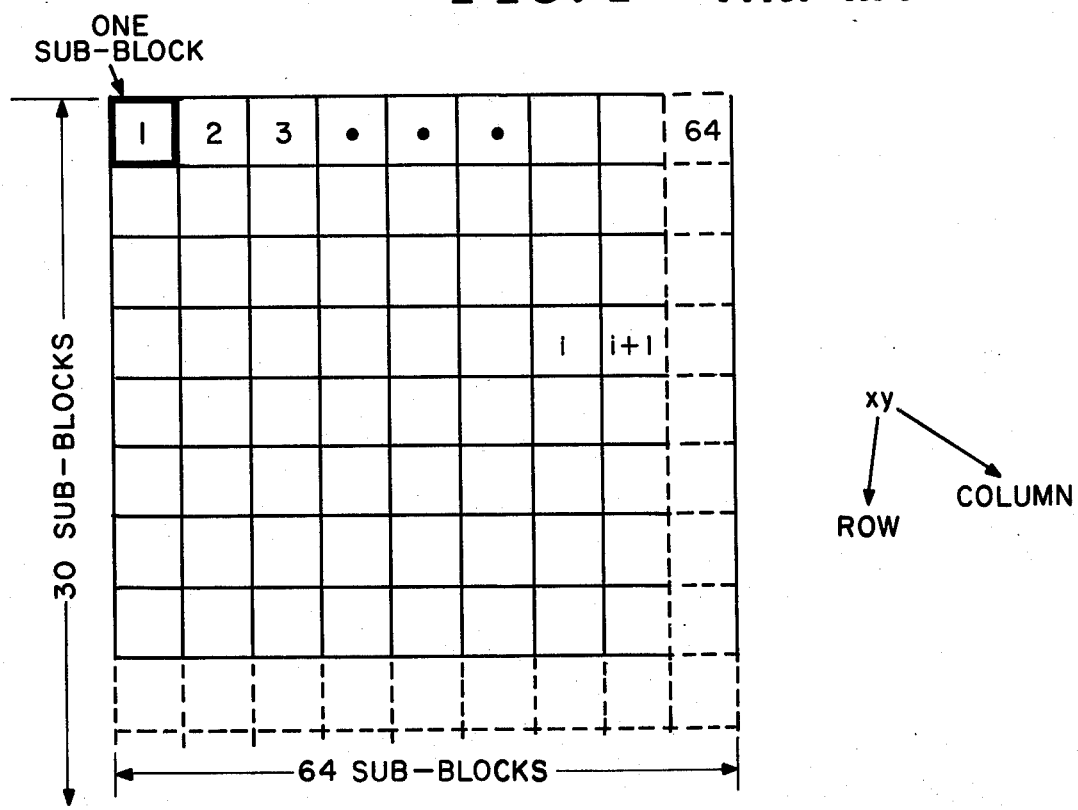
FIG. 2 illustrates a sampled image array that has been broken into 8 by 8 sub-blocks.

The video samples are taken from an image array consisting of a plurality of sub-blocks as shown in FIG. 2. It is assumed that each sub-block (e.g., 4 in FIG. 3) consists of a two-dimensional area 4 containing 64 individual pixel values, $f_{xy}{}^i$. Each sub-block will be referred to as an $8 \times 8$ sub-block. The transform processor is designed to do a two-dimensional transform on each $8 \times 8$ sub-block of pixel values within each video field of the frame. As shown in FIG. 2 it will be assumed that there are a total of 64 8 by 8 sub-blocks across eight horizontal lines and that there are 30 active 8 by 8 sub-blocks in the vertical direction contained in each field (240 lines per field). Most important, however, is to notice that since video is available in the standard TV raster format, only one row of each sub block is available during a single line time and it takes 8 horizontal line times before the complete $8 \times 8$ array of pixel values is available.

The fundamental mathematical formulation of the two-dimensional transform is $$F = TfT^{-1} \qquad (1)$$

where
  $f = N \times N$ array of video samples over spatial coordinates (x,y)
  $T = N \times N$ array of fixed weights (forward transform kernel)
  $F = N \times N$ two-dimensional coefficients of the array f For the discrete cosine transform, the matrix T is defined by $$T_{km} = \frac{\sqrt{2}}{N} \quad k = 0 \qquad (2)$$

$$T_{km} = \frac{\sqrt{2}}{N} \cos \frac{(2m+1)k\pi}{2N} \quad \begin{array}{l} k = 1,2, \ldots (N-1) \\ m = 0,1, \ldots (N-1). \end{array}$$

Figure 3:
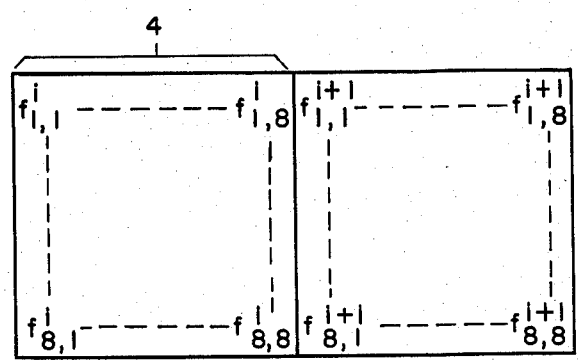
FIG. 3 illustrates how the data samples are organized within two adjacent two-dimensional sub-blocks.

Referring to FIG. 3 and noting that for the discrete cosine transform (DCT), $T^{-1}$ equals $T^T$ equation 1 can be expressed for any $8 \times 8$ pixel sub-block in matrix form as:

$$\begin{bmatrix} F_{00} \cdots F_{07} \\ \vdots \quad \vdots \\ F_{70} \cdots F_{77} \end{bmatrix} = \begin{bmatrix} T_{11} \cdots T_{18} \\ \vdots \quad \vdots \\ T_{81} \cdots T_{88} \end{bmatrix} \begin{bmatrix} f_{11} \cdots f_{18} \\ \vdots \quad \vdots \\ f_{81} \cdots f_{88} \end{bmatrix} \begin{bmatrix} T_{11} \cdots T_{81} \\ \vdots \quad \vdots \\ T_{18} \cdots T_{88} \end{bmatrix} \qquad (3)$$

The basic matrix multiplier chip consists of $8 \times 8$ elements and performs the mathematical operation $$\begin{bmatrix} T_{1,1} \cdots T_{1,8} \\ \vdots \quad \vdots \\ T_{8,1} \cdots T_{8,8} \end{bmatrix} \times \begin{bmatrix} V_{IN}(1) \\ \vdots \\ V_{IN}(8) \end{bmatrix} = \begin{bmatrix} V_{OUT}(1) \\ \vdots \\ V_{OUT}(8) \end{bmatrix} \qquad (4)$$

That is, a column vector of input voltages is multiplied by a matrix of fixed weights (on the chip itself) to yield a column vector of output voltages. The weights $T_{km}$ can be the weights required for the discrete cosine transform or any other transform that can be described by a constant transform matrix.

The use of a matrix multiplier chip to perform the calculations required in equation 3 requires that the input pixel data be organized so as to be consistent with the form given in equation 4. That is, in order to take a one-dimensional transform of the first line of 8 pixels using the matrix multiplier chip the data must be organized mathematically as $$\begin{bmatrix} F_0 \\ F_1 \\ F_2 \\ \vdots \\ F_7 \end{bmatrix} = \begin{bmatrix} T_{11} \cdots T_{18} \\ \vdots \quad \vdots \\ T_{81} \cdots T_{88} \end{bmatrix} \begin{bmatrix} f_{11} \\ f_{12} \\ f_{13} \\ \vdots \\ f_{18} \end{bmatrix} \qquad (5)$$

Equation 3 can be expressed in the desired format by applying the transpose operation, that is $$(F)^T = (TfT^{-1})^T = (TfT^T)^T \qquad (6)$$

$$F^T = Tf^T T^T \qquad (7)$$

In matrix form, $$\begin{bmatrix} F_{00} \cdots F_{70} \\ \vdots \quad \vdots \\ F_{07} \cdots F_{77} \end{bmatrix} = \begin{bmatrix} T_{11} \cdots T_{18} \\ \vdots \quad \vdots \\ T_{81} \cdots T_{88} \end{bmatrix} \begin{bmatrix} f_{11} \\ \vdots \\ f_{18} \end{bmatrix} \cdots \begin{bmatrix} f_{81} \\ \vdots \\ f_{88} \end{bmatrix} \begin{bmatrix} T_{11} \cdots T_{81} \\ \vdots \quad \vdots \\ T_{18} \cdots T_{88} \end{bmatrix} \qquad (8)$$

Figure 4:
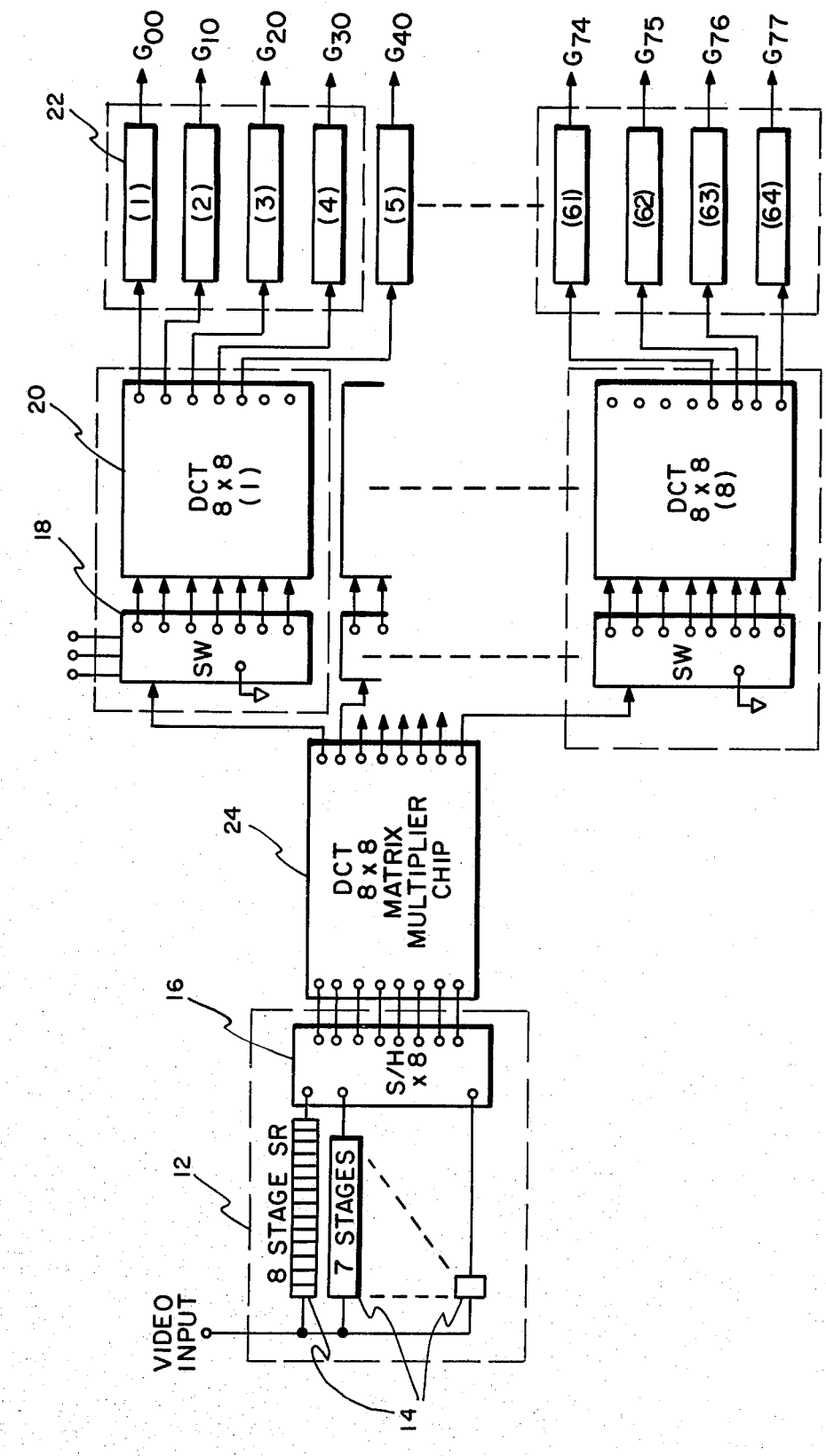
FIG. 4 represents the architecture of a two-dimensional transform processor constructed according to the instant invention.

Consider the product $Tf^T$ in equation 7. As discussed earlier and illustrated in FIG. 3, the only pixel values available during the first line of any $8 \times 8$ sub-block are $f_{11}, f_{12}, f_{13}, \ldots$ and $f_{18}$. Similarly, during line 2 of each $8 \times 8$ sub-lock $f_{21}, f_{22}, f_{23} \ldots f_{28}$ are available for processing, etc. Thus, as indicated by the partitioning shown in equation 8, the first level transform, that is a one-dimensional transform across the row of each sub-block of FIG. 2, can be accomplished using a single matrix multiply chip and a series to parallel CCD structure to perform the desired transpose of the pixel value matrix, f. The series to parallel converter, element 12 in FIG. 4 is an eight stage tap delay line with a sample and hold at the output of each tap.

Thus, the first matrix multiplier chip is used to perform a one-dimensional transform on each of the column vectors of $f^T$, as indicated by the matrix partitioning shown in equation 8, which is equivalent to transforming along the rows of the original $8 \times 8$ matrix of pixel values, f. This is done for each of the 64 blocks across the video line. The result of this transform on the first row of any pixel block is the first column of an intermediate result, namely:

$$\begin{bmatrix} T_{11} & T_{12} & T_{13} & \ldots & T_{18} \\ T_{21} & T_{22} & T_{23} & \ldots & T_{28} \\ T_{31} & T_{32} & T_{33} & \ldots & T_{38} \\ \vdots & \vdots & \vdots & & \vdots \\ T_{81} & T_{82} & T_{83} & \ldots & T_{88} \end{bmatrix} \begin{bmatrix} f_{11} \\ f_{12} \\ f_{13} \\ \vdots \\ f_{18} \end{bmatrix} = \begin{bmatrix} R_{11} \\ R_{21} \\ R_{31} \\ \vdots \\ R_{81} \end{bmatrix} \quad (9)$$

To describe how this intermediate result is used to realize the transform across the columns of f, consider the full matrix of intermediate results, R, for any pixel sub-block:

$$\begin{bmatrix} T_{11} & \ldots & T_{18} \\ \vdots & & \vdots \\ T_{81} & \ldots & T_{88} \end{bmatrix} \begin{bmatrix} f_{11} & \ldots & f_{81} \\ \vdots & & \vdots \\ f_{18} & \ldots & f_{88} \end{bmatrix} = \begin{bmatrix} R_{11} & \ldots & R_{18} \\ \vdots & & \vdots \\ R_{81} & \ldots & R_{88} \end{bmatrix} \quad (10)$$

As indicated in equation 8, this result is post-multiplied by $T^T$. That is $$\begin{bmatrix} F_{00} & \ldots & F_{70} \\ \vdots & & \vdots \\ F_{07} & \ldots & F_{77} \end{bmatrix} = \begin{bmatrix} R_{11} & \ldots & R_{18} \\ \vdots & & \vdots \\ R_{81} & \ldots & R_{88} \end{bmatrix} \begin{bmatrix} T_{11} & \ldots & T_{81} \\ \vdots & & \vdots \\ T_{18} & \ldots & T_{88} \end{bmatrix} \quad (11)$$

As described earlier, use of the matrix multiplier chip requires that a matrix of fixed weights must be post-multiplied by a variable input data vector. Consider the transpose of equation 11, $$(F^T)^T = (RT^T)^T \quad (12)$$

or $$F = TR^T \quad (13)$$

In matrix form, $$\begin{bmatrix} F_{00} & \ldots & F_{07} \\ \vdots & & \vdots \\ F_{70} & \ldots & F_{77} \end{bmatrix} = \begin{bmatrix} T_{11} & \ldots & T_{18} \\ \vdots & & \vdots \\ T_{81} & \ldots & T_{88} \end{bmatrix} \begin{bmatrix} R_{11} & \ldots & R_{81} \\ \vdots & & \vdots \\ R_{18} & \ldots & R_{88} \end{bmatrix} \quad (14)$$

It is important to note that the matrix of fixed weights, T in equation 14 is identical to the matrix T, used to calculate the transform across each row of the 8×8 pixel sub-block (see equation 8). Thus, a single matrix multiplier chip type, that has only one array of fixed weights, is necessary to implement the forward two-dimensional cosine transform. This is only true if $R^T$ can be accomplished. $R^T$ is realized simply by proper interconnection of the identical multiplier chips.

The elements of row 1 of $R^T$ in equation 14 are available during line number 1 of the video for each block and are always multiplied by the appropriate elements of column 1 of the T matrix. Thus during line number 1, equation 14 can be partitioned into 8 matrix products, namely:

$$\begin{bmatrix} F_{00}^1 \\ F_{10}^1 \\ F_{20}^1 \\ \vdots \\ F_{70}^1 \end{bmatrix} = \begin{bmatrix} T_{11} & T_{12} & T_{13} & \ldots & T_{18} \\ T_{21} & T_{22} & T_{23} & \ldots & T_{28} \\ T_{31} & T_{32} & T_{33} & \ldots & T_{38} \\ \vdots & \vdots & \vdots & & \vdots \\ T_{81} & T_{82} & T_{83} & \ldots & T_{88} \end{bmatrix} \begin{bmatrix} R_{11} \\ 0 \\ 0 \\ \vdots \\ 0 \end{bmatrix} \quad (15)$$

-continued $$\begin{bmatrix} F_{01}^1 \\ F_{11}^1 \\ F_{21}^1 \\ \vdots \\ F_{71}^1 \end{bmatrix} = [T] \begin{bmatrix} R_{21} \\ 0 \\ 0 \\ \vdots \\ 0 \end{bmatrix} \quad (16)$$

$$\begin{bmatrix} F_{07}^1 \\ F_{17}^1 \\ F_{27}^1 \\ \vdots \\ F_{77}^1 \end{bmatrix} = [T] \begin{bmatrix} R_{81} \\ 0 \\ 0 \\ \vdots \\ 0 \end{bmatrix} \quad (17)$$

where $F_{xy}^n$ is the contribution of each of the 64 frequency components due to the intermediate results available during line n of any 8×8 pixel sub-block.

Similarly, when the intermediate results associated with line 2 of the 8×8 pixel sub-block f are calculated, the second row of the $R^T$ matrix is available. The contribution of the second row to the 64 final two-dimensional transform coefficients is calculated as follows:

$$\begin{bmatrix} F_{00}^2 \\ F_{10}^2 \\ F_{20}^2 \\ \vdots \\ F_{70}^2 \end{bmatrix} = [T] \begin{bmatrix} 0 \\ R_{12} \\ 0 \\ \vdots \\ 0 \end{bmatrix} \quad (18)$$

$$\begin{bmatrix} F_{01}^2 \\ F_{11}^2 \\ F_{21}^2 \\ \vdots \\ F_{71}^2 \end{bmatrix} = [T] \begin{bmatrix} 0 \\ R_{22} \\ 0 \\ \vdots \\ 0 \end{bmatrix} \quad (19)$$

$$\begin{bmatrix} F_{07}^2 \\ F_{17}^2 \\ F_{27}^2 \\ \vdots \\ F_{77}^2 \end{bmatrix} = [T] \begin{bmatrix} 0 \\ R_{82} \\ 0 \\ \vdots \\ 0 \end{bmatrix} \quad (20)$$

These 64 partial results of the 64 two-dimensional DCT frequency components are then added to the contribution of the corresponding 64 components calculated during line 1. The partial sums for lines 3 through 8 are generated in a similar manner and after 8 lines:

$$F_{xy} = \sum_{n=1}^{8} F_{xy}^n \quad \begin{array}{l} x = 0,1,\ldots 7 \\ y = 0,1,\ldots 7 \end{array} \quad (21)$$

The sum of partial results is accomplished using a CCD accumulator structure.

In summary, the desired $TR^T$ product (see equation 13) is accomplished as follows:

During line 1 each of the outputs of the first matrix multiplier (i.e., the 8 one-dimensional transform coefficients for line 1 of each sub-block) are used to form 8 input vectors with 8 coefficient values occupying the first row position and zeros in the seven remaining row positions of the vectors. Eight matrix multiplier chips, all identical to the first chip, are then used to form the products shown in equations 15–17. The result of 64 partial coefficient values associated with line 1 are then stored. During line 2, each of the 8 one dimensional transform coefficients across row 2 of the 8×8 sub-block are used to form 8 vectors with the 8 coefficients occupying the second row position and zeros in the remaining 7 row positions of the vectors. The 8 identical matrix multiplier chips are then used to form the products shown in equations 18-20. The 64 partial coefficient values associated with line 2 are then added to the corresponding coefficient values calculated over line 1.

This process is repeated over all 8 lines for each of the 64 8×8 sub-blocks. It should be noted that since the position occupied by the output of the first matrix multiplying chip in the input vectors to the second level of 8 matrix multipliers is dependent upon a particular line within the 8×8 sub-block that is being processed. The operation of the transform processor as illustrated in FIG. 4 will now be explained in detail.

The series to parallel converter 12 accepts the input analog video signal from the first horizontal line of video and outputs 64 groups of 8 sampled analog pixel values across the active portions of the horizontal line. Each group of 8 pixel values can be fed into the 8×8 matrix multiplier chip 24 at a 1.21275 MHz rate.

The video input signal is simultaneously clocked into a set of eight delay lines 14, each one bit shorter than the next. With each clock cycle the shift register data is advanced until at the end of eight of the 9.702 MHz clock cycles the output contains pixels 1 through 8 in the proper order. The outputs are sampled and held simultaneously by sample and hold circuits 16. The sample and hold circuits 16 are activated every eighth shift register cycle, and retain the data until the next sample period so that an eight to one speed reduction is possible for the matrix multiplier and other transform associated chips. Since the analog shift registers inherently presample the analog data, so that it is fixed over a 50 nanosecond period, the window of the sample and holds can be a reasonable 10 to 20 nanoseconds. This requiement is certainly desireable compared to a 16 picosecond window needed for a time varying 9.702 MHz signal. The 8 outputs of multiplier 24 corresponding to the one dimensional transform of each group of 8 pixels are each switched via switching means 18 to each of 8 identical matrix multipliers 20. Switching means 18 is necessary to accept the appropriate transform coefficient input and place it in the proper vector format for further processing by the second level matrix multiplier 20. Since line 1 of the 8 lines is under consideration, each switching means 18 places the coefficient generated by the first multiplier chip 24 on the top position of each second level matrix multiplier 20 input (see equation 15). The 64 outputs, corresponding to the contribution of row 1 of each of the 64 sub-blocks to the 64 two-dimensional cosine transform coefficients, are stored in separate analog memory cells of the accumulator means 22. Thus at the completion of one line, each of the 64 partial coefficient values of all 64 sub-blocks across the horizontal line is stored in individual cells of accumulator means 22.

Similarly, during row 2, the video input is converted into 64 groups of 8 pixels each by the series to parallel converter means 12. Each group of 8 pixels is input to the first matrix multiplier means 24. During line 2, the switching means 18 at the input to the second level matrix multiplier means 20 is set to format a vector with the transform coefficient occupying the second position of the input vector, with the remaining 7 positions set to zero (see equation 18). 64 outputs, corresponding to the contribution of the second row of each sub-block 64 two dimensional cosine transform coefficients, are clocked into the appropriate cells of the accumulator means 22 and are added to the corresponding coefficient values generated during line 1. This process repeats itself 8 times until the 64 groups of 8 pixels each for the eighth row have proceeded through the second level matrix multiplier means 20 and have been clocked to the appropriate cells of accumulator means 22. The 64 accumulated sums in accumulator means 22, represented by Gij, are the transformed coefficients and can be read out and stored for further use. The next pixels at the video input will then be those that pertain to the ninth row of raster scanned data and the processor will then compute the two-dimensional transform for the next 64 sub-blocks, etc.

The matrix multiplier means can be constructed from conventional circuitry or by utilizing the described in U.S. Pat. Nos. 4,156,284 and 4,161,785 assigned to the assigne of the present invention. The matrix multiplier chip is an integrated circuit capable of performing a matrix operation in the analog domain. The basis of the multiplication process is a time proven technique of multiplication by the deposition of charge on a fixed size capacitor. Integrated circuit technology has enabled the integration of many parallel multiplication circuits on a single substrate.

The matrix multiplier chip is capable of performing the multiplications and additions required to multiply an 8×8 matrix of fixed coefficients by an 8×1 vector of variable input voltages, and produce an 8×1 output vector as shown in equation 4. The matrix of fixed coefficients is implemented as an array of capacitors each of a size determined by the coefficient desired. The size of the capacitor is accurate to 0.17 percent.

Figure 5:
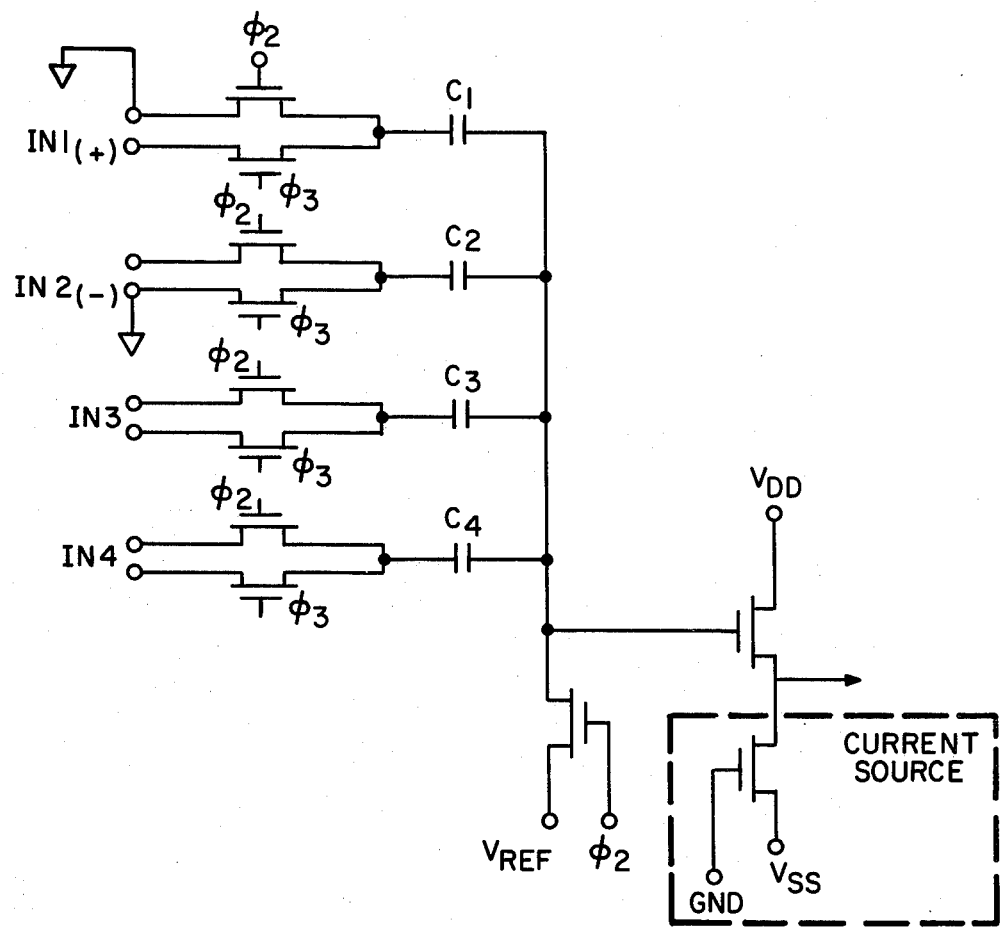
FIG. 5 is a schematic diagram of the input and output circuitry of the matrix multiplier chip.

The input and output circuitry of the matrix multiplier chip is shown in FIG. 5.

Figure 6:
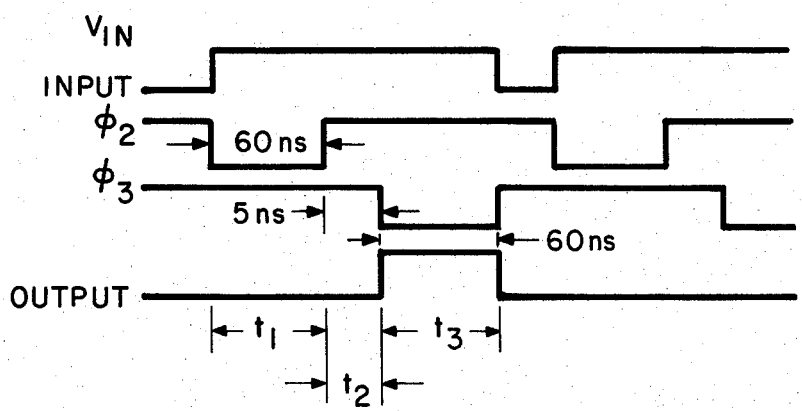
FIG. 6 illustrates some timing waveforms associated with the matrix multiplier chip.

The timing signals required to drive the matrix multiply chip are shown in FIG. 6. The indicated pulse widths are the minimum required. Thus, the maximum operating speed of the device is 8 MHz. Note that all the input voltages must be present at the matrix multiply chip inputs during times $t_1$, $t_2$ and $t_3$. Also, the output voltage is available only during time $t_3$.

The capacitors labeled $c_1$–$c_4$ represent the matrix weights whose sizes are determined by the user. Since capacitor size can only be positive, a special technique must be used to obtain a negative weight. As shown in FIG. 5, a positive weight is implemented by tying the FET connected to $\phi_2$ to a ground, and a negative weight is made by connecting the FET driver connected to $\phi_3$ to ground.

During time 1, all FETs connected to $\phi_2$ are allowed to conduct. All the capacitors will be charged to a specific voltage. If a positive coefficient is to be implemented, the capacitor charges to the difference between ground and the reference voltage. For negative coefficients the capacitor is charged to the difference between the analog input voltage and the reference voltage. During time 2 all FETs are nonconducting and one side of all the capacitors is allowed to float. During time 3 all FETs connected to $\phi_3$ are allowed to conduct. For the positive coefficients, the capacitor charges up to the signal voltage while the negative coefficient capacitors discharge to ground. Since one side of all the capacitors is connected to a bus, these charges cause the one side of the capacitors to change in voltage proportional to the inner product of the input voltages and the capacitor weights. The output from each bus is then passed through an emitter follower circuit. This output voltage is a change from a reference voltage (determined by $V_{REF}$) and may be either a positive or a negative change.

Figure 7:
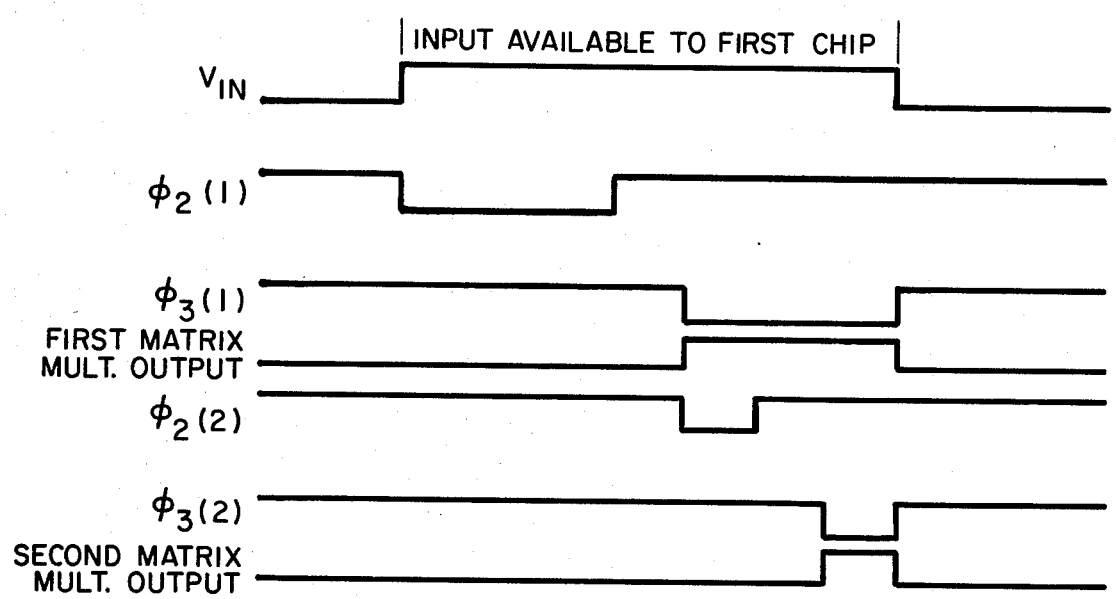
FIG. 7 illustrates some timing waveforms associated with interfacing two matrix multiply chips.

To interface two matrix multiply chips, the timing of the second matrix chip must be adjusted to occur within the output signal duration of the first matrix multiplier. A typical set of timing signals for this situation is shown in FIG. 7. The frequency of operation of the two devices is the same when interfaced. However, the duty cycle of the second matrix multiply chip must be adjusted.

The proposed system will operate the matrix chip at (9.702 MHz)/8 = 1.21275 MHZ. This is well within the speed limitations of the device.

The matrix multipliers with the switching means 18 are identical to the chips just described except that an input switch sequentially connects the single input line to one of the multiplier section inputs. This input switch also sets all of the other multiplier section inputs to ground. As each video line is addressed the selected input of the multiplier section is advanced by one.

Figure 8:
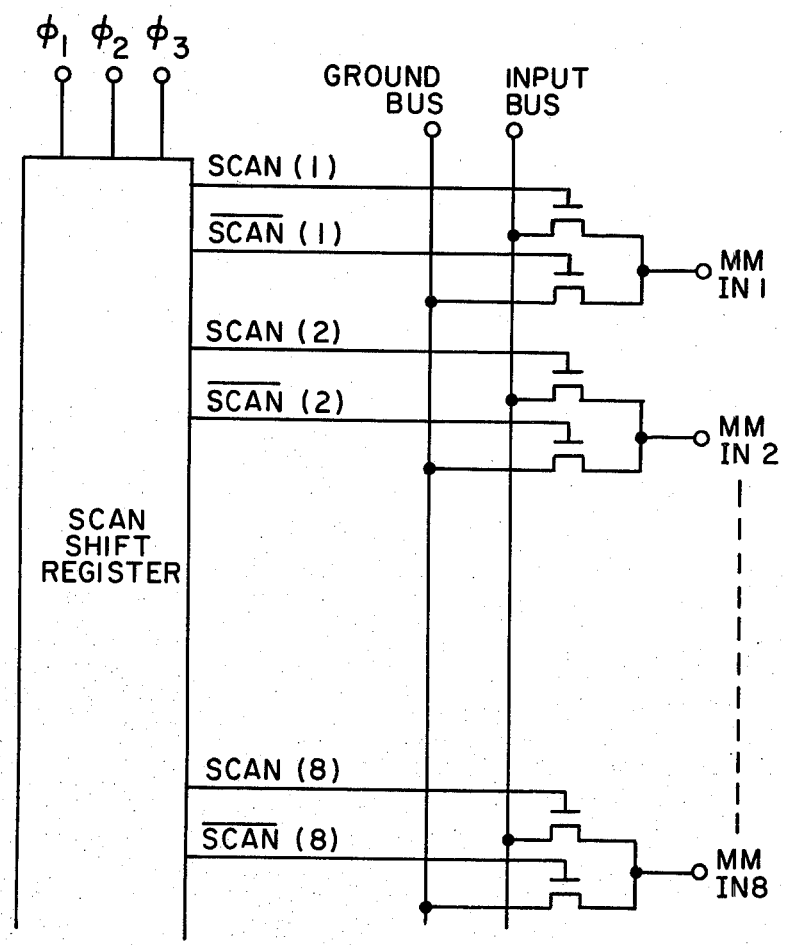
FIG. 8 represents a portion of the input switching of one of the matrix multipliers.

FIG. 8 shows a portion of the input switching of one of the matrix multipliers 20 with the switching means 18. The switching is controlled by a scan shift register which advances one stage per video line time under the control of a three phase clock. The signal and its inverse operate a pair of transistors which switch the addressed line from ground to the input bus. The shift register, the input switches, the 8×8 array and all of the output circuitry is integrated on a single chip approximately 100×125 mils in size. The term MM IN1 in FIG. 8 denotes the first input line into the matrix multiplier.

Figure 9:
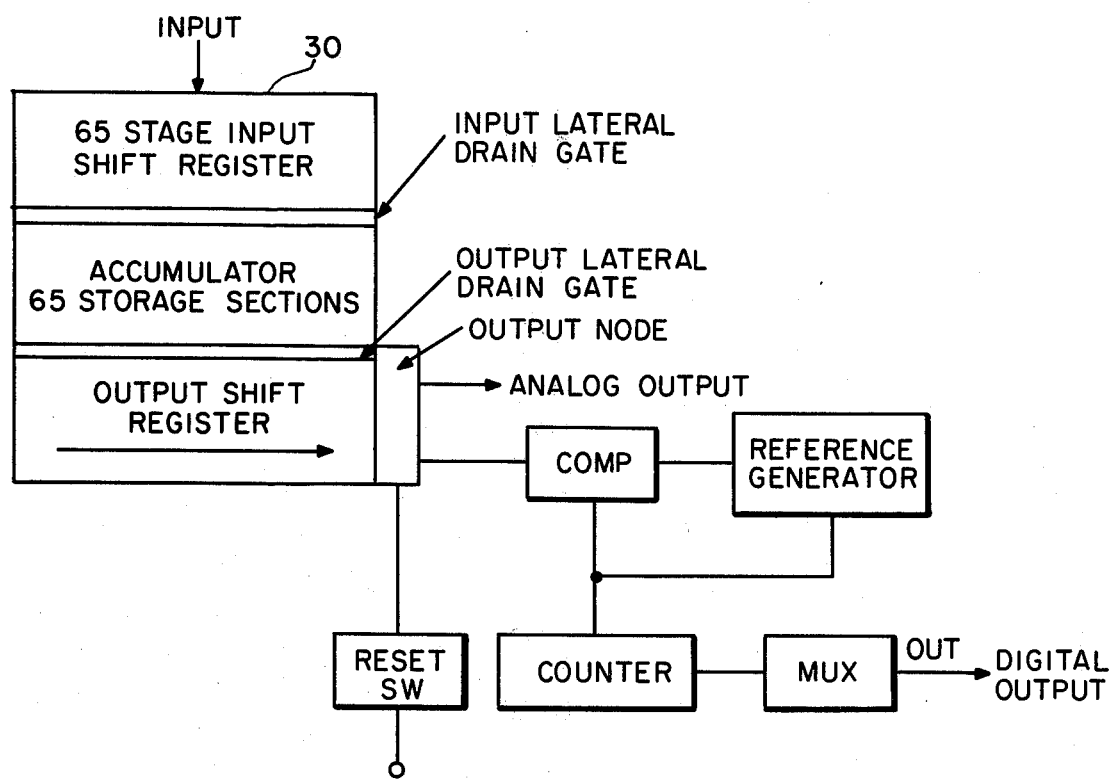
FIG. 9 is a block diagram of the accumulator structure.

The accumulator means 22 can be realized with an integrated circuit (FIG. 9) which performs 65 simultaneous additions, analog data storage in excess of eight lines of video, and on-chip programmable A/D conversion. Provision is also made on the chip for system dark current level shift and comparator offset compensation.

The operation of accumulator means 22 can be described as follows: The input of the 65 stage accumulator shift register 30 samples the input voltage (output of second level matrix multiplier) and converts it to a quantity of charge (since it is assumed that the input is still an analog signal) by means of a linear "Fill and Spill" input sampler. This charge is transferred serially along the input shift register until the entire line of 65 samples (64 samples and 1 blank) are positioned adjacent to their respective storage cell. During this operation the input lateral drain gate prevents conduction between the input register and the storage region. The charge is then transferred laterally by pulsing the lateral drain gate to allow conduction between the shift register and the accumulator storage register. The storage register is made large enough, so that this process can be repeated eight times until charge from all eight video lines has been summed. This structure provides an accurate means for forming the required analog sums. Every sample is introduced into the system by a single linear device so that summing accuracy is preserved. Positive and negative input signals are represented as quantities of charge above or below a reference level and are thus summed automatically by simply adding the charge samples. The same reference level is also employed for the 65th, or blank, sample so that a two quadrant output signal may be derived from the difference between the signal level and the blank level. This procedure can be used to remove any offset voltage or fixed errors from the output and compensate for temperature drift.

The accumulator output shift register is controlled by separate clocks. The separate output register allows information to be clocked into the device at the same time as information is clocked out, permitting full duty cycle operation. Flow of charge from the storage region to the output register is controlled by the output lateral drain. Dynamic range requirements of the system dictate that the accumulator storage region and output register be eight times as large as the input shift register.

The portion of the accumulator chip described above requires two clocks for the input shift register, two lateral drain gate commands, and two clocks for the output shift register. These clocks operate at 1.21275 MHz, 15.75 KHz, 1.96875 KHz and 151.59375 KHz respectively.

In addition to the circuitry described, the accumulator has an on-chip A/D converter. Both an analog and a 4 bit digital A/D converted output are available.

Figure 10:
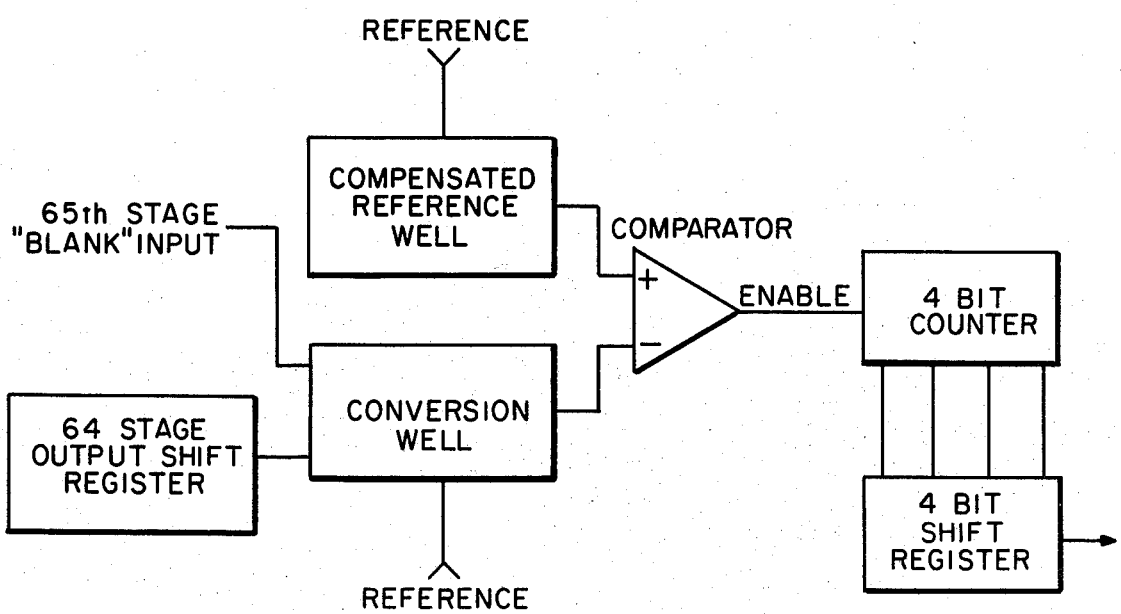
FIG. 10 is a block diagram of the integrating type A/D converter.

The speed of the output register is slow enough to allow the implementation of an integrating type A/D converter using CTD technology. This A/D converter is shown diagramatically in FIG. 10. Note that the output register is shown as 64 1 stages long. The 65th storage region contains the long term average of a blank sample or zero reference. This cell is transferred to the output node in the same manner as all the other charge samples, but contains a charge offset caused by the bias errors from channel to channel of the matrix multiply operation plus dark current drift in the accumulator.

This charge is designated as $Q_B$. Each of the sixty-four signal output samples can be said to contain a signal charge plus a DC bias error term $Q_B$, or $Q_O = Q_B \pm Q_S$ where $Q_S$ is the signal charge and $Q_O$ is the charge in any well of the output register.

The previously mentioned reference for the chip is derived from an external PROM and D/A Converter to allow for non-linear quantization. This reference is connected to a fill and spill input to translate the voltage to charge. These levels of charge, $\Delta q_i$, vary in number from 0 to 14 during any conversion. Each $\Delta q_i$ is not the same due to the system's nonlinear quantization requirement.

During a short three microsecond start-up period seven charge samples are added to the shift register output node to which the blank cell test charge has been transferred. This same amount (7 samples) of charge is read into the reference well. After the seventh charge sample has been added to the node, the state of the comparator is sensed. If the voltage on the test node is more positive than the reference node, charge is added to the reference node. If it is more negative, charge is subtracted from the reference node. In this manner repeated sampling of the blank, or test, sample provides a reference level which on the average is equal to the level of the blank sample plus seven test charge packets. This procedure eliminates the comparator offset error in addition to the previously mentioned errors. A quantization error introduced by the discrete size of the charge added to or subtracted from the reference node is minimized by minimizing the size of that charge packet relative to the minimum bit size.

The A/D converter is now ready to measure the signal packets. The signal is compared to the compensated reference level. If the output charge is greater than the reference charge, the comparator will change state and enable the counter. If the output charge is less than the reference charge, charge will be added to the conversion well. Thus, the counter will be enabled when $$Q_0 + \sum_{i=1}^{n} \Delta qi > Q_B + \sum_{i=1}^{7} \Delta qi \qquad (22)$$

Since $Q_0 = Q_B \pm Q_s$ $$\pm Q_s + \sum_{i=1}^{n} \Delta qi > \sum_{i=1}^{7} \Delta qi \qquad (23)$$

The number n may vary from 0 to 14. If n is 0, indicating a maximum signal, the counter is enabled for 15 counts. If n is 14, the counter is enabled for 1 count. An on-chip binary counter and shift register converts this signal into a four bit serial binary output, thus an A/D conversion is performed. The reference voltage must change sixteen times as fast as the 151.59375 KHz accumulator output shift register clock, or at 2.4255 MHz. This part of the chip will require a 2.4255 MHz clock, a reference voltage which changes at the same rate, and a 606.375 KHz digital shift register clock.

What is claimed as new and desired to be secured by Letters Patent of the United States is:

1. A two-dimensional transform processor capable of sampling each pixel of raster scanned serial data every tp seconds comprising:
   a series to parallel data converter means which accepts N raster scanned serial data samples and transforms the order of said samples into a parallel order;
   a first matrix multiplier means capable of accepting data from said series to parallel data converter means in a parallel order every Ntp seconds and yielding N one-dimensional transformed data samples as output values every Ntp seconds;
   at least N switching means, each of said switching means having one input terminal and N output terminals, each input terminal of each of said switching means being connected to said first matrix multiplier so as to accept one of the N one-dimensional transformed data samples, said N output terminals of each of said N switching means having one data sample and N-1 zero valued samples;
   at least N second matrix multiplier means, each of said second matrix multiplier means having N input terminals and N output terminals, each of said N input terminals being connected to N output terminals of one of said N switching means, each of said N second matrix multiplier means computing N partial products every Ntp seconds;
   an accumulator means which accumulates $N^2$ partial products which comprise the two-dimensional transform of said raster scanned serial pixel samples.

2. The two-dimensional transform processor as set forth in claim 1 wherein said series to parallel data converter means further comprises:
   an input line which receives a video signal sample every clock cycle (tp seconds);
   a set of N analog delay lines, each said delay line having an input end connected to said input line and an output end, each of said delay lines being one sample shorter than the next, with the longest delay line being N samples long so that at the end of N clock cycles, N video signals which had been in a serial order on said input line are in a parallel order at the outputs of said N analog delay lines.

* * * * *